Figure 1:
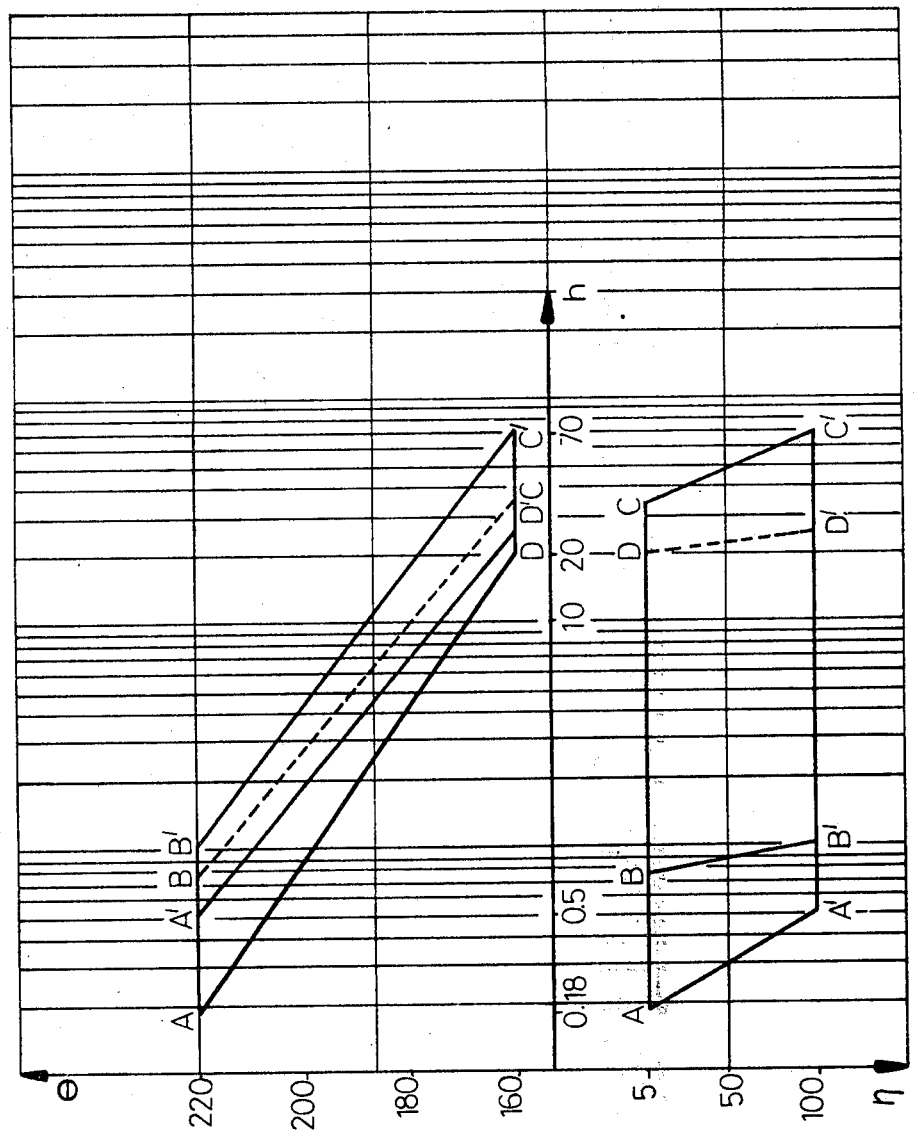

United States Patent [19]
Chapurlat et al.

[11] 3,907,675
[45] Sept. 23, 1975

[54] SEMI-PERMEABLE POLYVINYL ALCOHOL MEMBRANES

[75] Inventors: Robert Chapurlat, Ecully; Louis Nicolas, Neuilly; Richard Dick, Paris, all of France

[73] Assignee: Rhone-Poulenc S.A., Paris, France

[22] Filed: July 19, 1973

[21] Appl. No.: 380,751

[30] Foreign Application Priority Data
July 20, 1972 France.............................. 72-26232
June 13, 1973 France.............................. 73-21493

[52] U.S. Cl................ 210/23; 210/500 M; 264/41; 264/345; 264/236
[51] Int. Cl.²........................B01D 13/00; B01D 39/14; B29D 27/00; B29C 25/00
[58] Field of Search ............. 210/23, 321, 490, 500; 264/41, 49, 234, 236, 345, 347

[56] References Cited
UNITED STATES PATENTS
3,556,305  1/1971  Shorr................................. 210/490

OTHER PUBLICATIONS

Ultrafiltration of Salt Solutions by Ion-Excluding and Ion Selective Membranes — Reid et al., Jour. of Appl. Poly. Sci., Vol. IV, No. 12, pp. 354–361.

Chem. Abstracts — Vol. 74, 1971, 23183$d$, Kolnibolotchuk.

*Primary Examiner*—Frank A. Spear, Jr.
*Assistant Examiner*—Ferris H. Lander
*Attorney, Agent, or Firm*—Stevens, Davis, Miller & Mosher

[57]  ABSTRACT

Polyvinyl alcohol material, having good handleability and porosity making it suitable for use in reverse osmosis, is provided by a process which comprises subjecting the material, successively, to
  i. a dry heat treatment within carefully defined limits of temperature, time and viscosity, and
  ii. a hot water treatment.

8 Claims, 2 Drawing Figures

SEMI-PERMEABLE POLYVINYL ALCOHOL MEMBRANES

The present invention relates to the preparation of polyvinyl alcohol membranes and to the use of such membranes in, for example, the fractionation of saline solutions by the technique of reverse osmosis.

In reverse osmosis, it has already been proposed to use membranes of polyvinyl alcohol crosslinked by a heat treatment (see Reid and Spencer, Journal of Applied Polymer Science, vol. IV, No. 12, pages 354–361, [1960]) or by being brought into contact with an isocyanate (see Lonsdal etal, "Reverse Osmosis for Water Desalination," Research and Development Progress Report, No. 150, October 1965). French Pat. No. 2,088,598 describes in more detail membranes for reverse osmosis made a film-forming polymer, such as polyvinyl alcohol, having a degree of cross-linking which varies, depending on the thickness of the membrane, the cross-linking agent preferably being a diisocyanate. Such membranes have very satisfactory properties, both with regard to the degree of rejection of the salt (NaCl) and the flow rate of the water; this is the result of a technique which makes it possible to prepare membranes of extremely low thickness (less than 10 $\mu$).

The present invention relates to the first type of crosslinking mentioned above, that is cross-linking by a heat treatment. The process of the invention makes it possible to impart valuable osmotic properties to polyvinyl alcohol films; for example, in the case of flat films, a flow rate (relative to a film of thickness 1 $\mu$ [determined by the product : flow rate (in l/day.m²) ×to thickness (in $\mu\mu$)]) greater than 1,000 l/day.m² (for an aqueous solution of NaCl of concentration 35 g/l uner a pressure of 100 bars at 30°C.) can be achieved although the films are of a thickness such that they may be handled and assembled in osmosis apparatuses with comparative ease.

The membranes treated by the process of the invention can be used not only for fractionating solutions containing sodium chloride but also for fractionating solutions containing other salts, and particularly sulphates.

The process of the present invention, which can be carried out on material of thickness between 10 50 $\mu$ made from polyvinyl alcohol of ester number between 0 and 5, comprises successively:

a. A dry heat treatment of the material, at a temperature of from 160° to 220°C. and for a period of from 10 minutes to 70 hours, the duration and the temperature of the treatment and the viscosity of the polyvinyl alcohol being interrelated, as will be explained below; and b. a heat treatment in water under atmospheric pressure at a temperature above 90°C. for more than 5 minutes.

More specifically, the present invention provides a process for the heat treatment of material of thickness from 10 to 50 $\mu$, made of polyvinyl alcohol of ester number from 0 to 5, and of viscosity, as a 4% by weight aqueous solution, from 5 to 100 cPo at 20°C., which comprises subjecting the material to, successively, i. a dry heat treatment, carried out under conditions such that the point M (defined, in a system of those rectangular cartesian co-ordinates, $\theta$, $h$ and $\nu$, denoting respectively the temperature in degrees Centigrade, the duration in hours of the heat treatment represented on a logarithmic scale and the viscosity in cPo at 20°C. of a 4% by weight aqueous solution of the polyvinyl alcohol) is contained within a solid A B C D A' B' C' D', the said solid having four plane faces A B B' A', A' B' C' D', D' C' C D and A B C D and two faces in the form of hyperbolic paraboloids, A A' D D' and B B' C C', said solid being defined by the frontal and horizontal projections of its apices in FIG. 1 of the accompanying drawings, and ii. a treatment in water at a temperature of 90°C or above 90°C. for more than 5 minutes.

The polyvinyl alcohol used for form the material must have an ester number within the limits indicated above, prefereably from 0 to 2, and a viscosity (as a 4% by weight aqueous solution) from 5 to 100 cPo, preferably from 20 to 90 cPo, at 20°C. Apart from these restrictions, any type of polyvinyl alcohol can be used, and it can, for example, be produced by one of the various known continuous or discontinuous processes.

The material which can be treated by the process of the invention can be, for example, in the form of a flat or tubular film or hollow fibres, in which case the thickness specified for the material is that of the wall of the hollow fibre. The external diameter of the hollow fibres is generally from 30$\mu$ to 1 mm, and preferably from 50 to 400 $\mu$, the internal diameter being above 5$\mu$.

The formation of a polyvinyl alcohol film is generally carried out by pouring a solution of the polymer onto a non-stick support such as a glass plate, and then removing the solvent. In the case of tubular films and, especially, hollow fibres, known spinning techniques may be used; for example a solution of polyvinyl alcohol may be passed through a spinneret with an annular orifice and the solvent removed by any known means, for example, by extraction employing a nonsolvent for the polymer which is miscible with the solvent to be extracted.

Since the first heat treatment of the polyvinyl alcohol material is carried out under dry conditions, the polyvinyl alcohol material must be manufactured beforehand and dried.

The solid A B C D A' B' C' D' is the section of a prism with a trapezoidal base formed by two hyperbolic paraboloids.

The first of these hyperbolic paraboloids corresponds to the face A A' D D' and is generated either by the displacement of a horizontal straight line resting on the straight lines A D and A' D', or by the displacement of a straight line parallel to the frontal projection plane and resting on the straight lines A A' and D D'.

The second of these hyperbolic paraboloids corresponds to the face B B' C C' and is generated either by the displacement of a horizontal straight line resting on B C and B' C', or by the displacement of a straight line parallel to the frontal projection plane and resting on B B' and C C'.

The four plane faces of the solid A B C D A' B' C' D' are trapezia; moveover, all the sections of the solid A B C D A' B' C' D' by horizontal or vertical planes are also trapezia.

Figure 2:
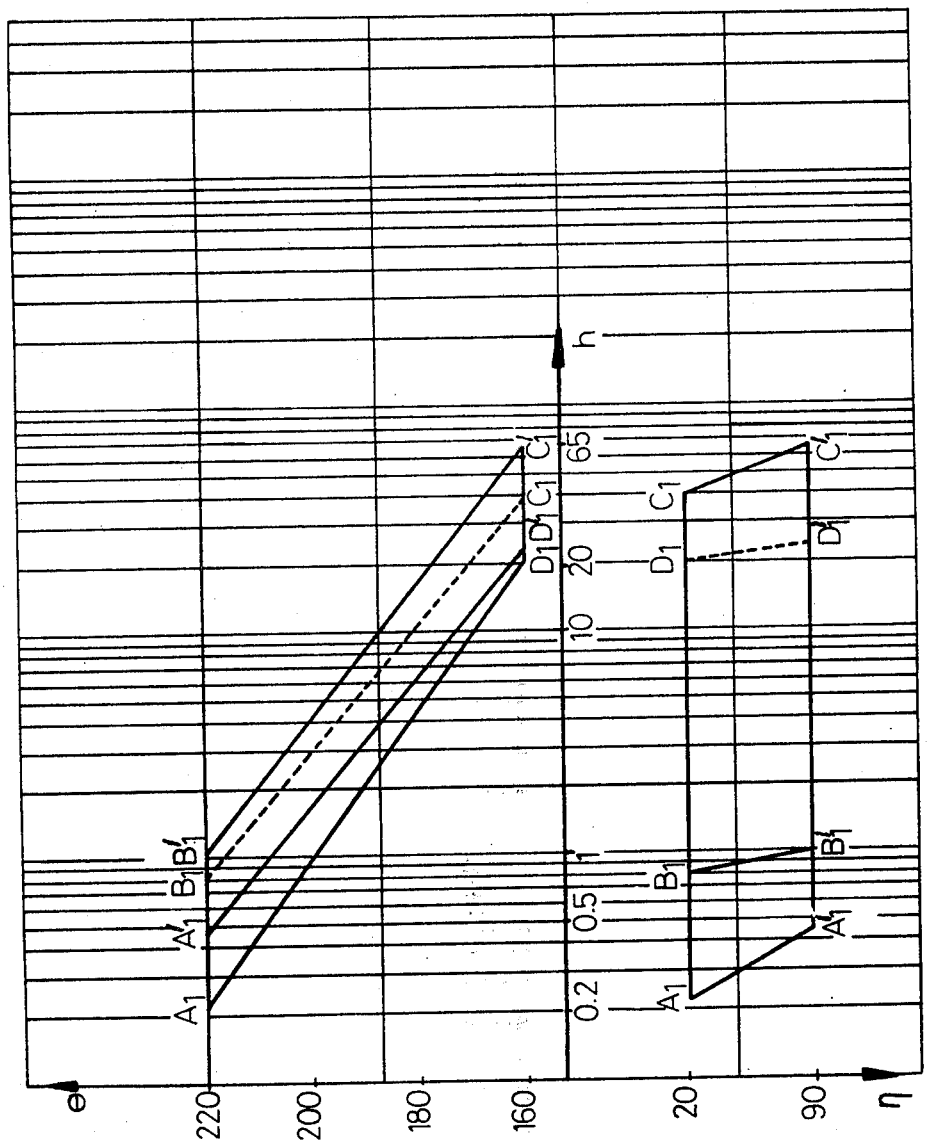

In the treatment of the preferred films made from a polyvinyl alcohol of viscosity (as a 4% by weight aqueous solution) between 20 and 90 cPo, the conditions of temperature and duration of the heat treatment must be such that the point $M_1$ — defined in the same way as the point M — is contained within a solid $A_1$ $B_1$ $C_1$ $D_1 - A'_1 B'_1 C'_1 D'_1$ represented by FIG. 2 of the accompanying drawings.

The solid $A_1 B_1 C_1 D_1 A'_1 B'_1 C'_1 D'_1$ possesses the same geometric characteristics as the solid $A B C D A' B' C' D'$. It differs from the latter only in the position of its apices.

The second heat treatment of the process of the invention is carried out in hot water at atmospheric pressure. The temperature of the water must be 90°C or above 90°C., and the maximum temperature possible is just below the boiling point of water, generally below 99.9°C. The duration of the treatment in water is preferably longer than 10 minutes; it can, for example, be as long as 5 hours.

It should be mentioned that either or both of the heat treatments mentioned above can be carried out in one or more stages. Thus the heat treatments may be interrupted by periods of cooling when the temperature can fall to ambient temperature; the duration of these periods of cooling can range from a few minutes to several hours. The duration of the heat treatment represented by the co-ordinate $h$ in the Figures does not, of course, include these periods of cooling.

It is to be understood that the conditions defined in FIGS. 1 and 2 represent optimum conditions, generally giving rise to films which combine good permeability (flow rate) with acceptable selectivity (degree of rejection); for this reason working conditions which depart only slightly from the conditions defined by the said diagrams are within the scope of the invention.

After the treatment in hot water, the membranes are suitably dried at atmospheric pressure or below atmospheric pressure, and at a temperature which can, for example, vary between 20° and 100°C. When assembling a membrane treated by the process of the invention in an osmosis apparatus, it is advantageous to moisten the membrane, for example by immersing it in water at ambient temperature for a few minutes to several hours.

The membranes treated by the process of the invention can be used directly in the fractionation of solutions by reverse osmosis. It is however possible to apply additional treatments to the mebranes, such as, a surface cross-linking by exposing the membrane to vapours of a cross-linking agent such as diisocyanate. This cross-linking technique is described in more detail in Belgian Pat. No. 765,463.

The membranes, cross-linked by heat and optionally surface treated, can be employed under the usual conditions for reverse osmosis. In particular, they can operate at a temperature from, for example, 20° to 60°C. and for salt concentrations which can exceed 100 g/l. In practice, there is no lower concentration limit, it being possible for the solute to be present in trace amounts. The pressure used is generally greater than 5 bars and usually from 10 to 150 bars. For a NaCl concentration of 35 g/l and under a pressure of 100 bars (temperature 30°C)., the degree of rejection is generally between 35 and 50%.

The membranes of the present invention can be used for fractionating NaCl solutions and also solutions containing other chlorides (for example, calcium chloride and magnesium chloride) or salts of other acids, particularly carbonates or sulphates. It should be noted that the membranes show a particularly high degree of rejection towards sulphates.

The following Examples further illustrate the invention.

In Examples 1 to 10, the membranes were manufactured in the following way:

A solution of polyvinyl alcohol in dimethylsulphoxide (concentration 10% by weight) is prepared and this solution is poured onto a glass plate surrounded by a metal frame. The thickness of the layer is about 250 $\mu$. The solvent is removed (pressure reduced to 200 mm of mercury, temperature 40°C., duration 17 hours).

Discs are then cut out of the film produced and are glued around their periphery to cylindrical rings made of pyrex glass.

The heat treatment is carried out in an oven. Four samples are used for each test and the properties are determined from the average of the results of the four samples.

Unless otherwise stated, the polyvinyl alcohol used has an ester number of 0 and a viscosity, as a 4% by weight aqueous solution, of 30 cPo at 20°C. Likewise, unless otherwise stated, osmosis is carried out under a pressure of 100 bars on a solution containing 35 g/l of NaCl. When the duration of the test is mentioned, this is given starting from the pressurisation of the cell.

EXAMPLE 1

A polyvinyl alcohol film is prepared, is glued to a cylindrical ring made of pyrex glass (external diameter 9.5 cm, internal diameter 9 cm and height 3 cm) and is placed in an oven at 210°C. for 20 minutes. The film is then left in air for 2 weeks and is then subjected again to a heat treatment at 210°C. for 20 minutes. The film is then immersed for 15 minutes in water at 95°C. and then left in air at 25°C. for 24 hours.

The film is then moistened and laid on a filter (trademark MILLIPORE VSWP) and the whole is placed in a reverse osmosis cell.

As the test is taking place, the temperature of the NaCl solution is raised from 25.5° to 45.1° and then allowed to fall back to 30°C.

At the end of the test, the duration of which is 600 hours, the film is dried by leaving it in air at 25°C. for 24 hours; its thickness is then 13 $\mu$.

The results are given in the following Table:

| Time from pressurise-ation | Temperature of the NaCl solution (°C) | Flow rate (l/day .m²) | Degree of rejection of NaCl (%) | Flow rate calculated for a film of thickness 1 $\mu$ (l/day .m²) |
|---|---|---|---|---|
| 1.5 | 25.5 | 96.5 | 41.4 | 1,250 |
| 70 | — | 86 | 48.4 | 1,130 |
| 90 | — | 85 | 50.7 | 1,100 |
| 120 | 30 | 96 | 52.7 | 1,250 |
| 216 | — | 97 | 52.7 | 1,260 |
| 240 | 35 | 112 | 52.7 | 1,450 |
| 287 | 35.2 | 115 | 53.9 | 1,495 |
| 377 | 40 | 126 | 53.0 | 1,640 |
| 403 | 40 | 127 | 53.9 | 1,650 |
| 427 | 45.1 | 142 | 51.3 | 1,840 |
| 474 | 45 | 141 | 52.2 | 1,830 |
| 547 | 40 | 125 | 53.3 | 1,625 |
| 600 | 30 | 89 | 56.7 | 1,150 |

EXAMPLE 2

The procedure of Example 1 is repeated but carrying out two treatments of 20 minutes at 210°C. with an interval of 1 day between instead of two treatments of 20

...nutes at 210°C with an interval of 2 weeks. The treatment in water at 95°C. lasts for 15 minutes. The temperature of the NaCl solution is 30°C. At the end of the test, the thickness of the dry film is 20 $\mu$.

The following results are noted:

| At the end of: | Flow rate ($l/day.m^2$) | Degree of rejection of NaCl % | Flow rate for a film of 1 $\mu$ ($l/day.m^2$) |
| --- | --- | --- | --- |
| 1.5 hours | 65 | 38 | 1,300 |
| 19 hours | 65 | 39 | 1,300 |
| 100 hours | 64 | 39.7 | 1,280 |
| 142 hours | 63.5 | 40.8 | 1,270 |

EXAMPLE 3

The test of Example 2 is repeated, carrying out a 30 minute treatment instead of a 15 minute treatment in water at 95°.

Under the conditions of Example 2, the following results are noted (thickness of the dry film after the test: 12 $\mu$).

| At the end of: | Flow rate ($l/day.m^2$) | Degree of rejection of NaCl % | Flow rate for a film of 1 $\mu$ ($l/day.m^2$) |
| --- | --- | --- | --- |
| 24 hours | 132 | 38.6 | 1,584 |
| 94 hours | 130 | 39.4 | 1,560 |
| 190 hours | 130 | 40.6 | 1,560 |
| 262 hours | 129 | 40.6 | 1,548 |

EXAMPLE 4

Using the membrane manufactured according to Example 3 for the reverse osmosis of a solution of NaCl at a concentration of 5 g/l (temperature of the solution: 37°C), the following results are noted:

| At the end of: | Flow rate ($l/day.m^2$) | Degree of rejection of NaCl % |
| --- | --- | --- |
| 5 hours | 170 | 44.5 |
| 75 hours | 169 | 46.8 |
| 190 hours | 163 | 46.8 |

EXAMPLE 5

The membrane manufactured according to Example 3 is used for the reverse osmosis — under a pressure of 80 bars — of solutions of various salts. The duration of the test is 150 hours per solute; the thickness of the dry film at the end of the test is 12 $\mu$.

The following results are noted:

| Solute | Concentration g/l | Flow rate ($l/day.m^2$) | Degree of rejection of the solute % | Temperature of the solution |
| --- | --- | --- | --- | --- |
| NaCl | 4.7 | 140 | 41 | 35°C |
| $Na_2SO_4$ | 12 | 138 | 94 | 35°C |
| $CaCl_2$ | 9.4 | 140 | 50 | 35°C |
| $MgCl_2$ | 9.5 | 123 | 54 | 30°C |

EXAMPLE 6

A film is prepared from a 7% by weight solution in dimethylsulphoxide of the polyvinyl alcohol used in the preceding examples. This film is treated as in Example 3 (twice 20 minutes at 210°C; 30 minutes in water at 95°C) and use in reverse osmosis (aqueous solution containing 35 g of NaCl/l; pressure: 100 bars; temperature 30°C). The thickness of the film is 16 $\mu$ at the end of the test.

The following results are noted:

| At the end of: | Flow rate ($l/day.m^2$) | Degree of rejection of NaCl % | Flow rate for a film of 1 $\mu$ ($l/day.m^2$) |
| --- | --- | --- | --- |
| 5 hours | 64.4 | 40.8 | 1,030 |
| 18 hours | 64.5 | 41.4 | 1,032 |

EXAMPLE 7

The polyvinyl alcohol film is treated at 210°C for 60 or 90 minutes and is then immersed in water at 99.6°C (30 minutes). The osmotic properties are as follows:

| | |
| --- | --- |
| After 60 minutes at 210°: | Flow rate: 108 $l/m^2.day$ |
| | Degree of rejection of NaCl: 42.2% |
| | Flow rate for a film of 1 $\mu$ (actual thickness 14.8 $\mu$): 1,600 $l/day.m^2$ |
| After 90 minutes at 210°: | Flow rate 24.2 $l/m^2.day$ |
| | Degree of rejection of NaCl: 40.3% |
| | Flow rate for a film of 1 $\mu$ (actual thickness 50 $\mu$): 1,210 $l/day.m^2$. |

EXAMPLE 8

The test of Example 7 is repeated, carrying out the 30 minute treatment at 99.6°C on films which have previously been treated at 165° for 30 hours.

| | |
| --- | --- |
| The following results are noted: | |
| Flow rate | 53 $l/day.m^2$ |
| Degree of rejection of NaCl: | 36% |
| Flow rate for a film of 1 $\mu$ (actual thickness: 26 $\mu$): | 1,380 $l/day.m^2$. |

EXAMPLE 9

Polyvinyl alcohol films are treated at 160°. These films are then immersed in water at 95° for 30 minutes. The following results are noted:

| For a treatment which lasts for: | Thickness of the film | Flow rate ($l/day.m^2$) | Degree of rejection of NaCl % | Flow rate for a film of 1 $\mu$ ($l/day.m^2$) |
| --- | --- | --- | --- | --- |
| 30 hours | 31 $\mu$ | 66 | 46.5 | 2,056 |
| 33 hours | 44 $\mu$ | 40 | 54 | 1,760 |

By way of comparison, after a treatment of 60 hours, the flow rate is 7.2 $l/day.m^2$ and the degree of rejection is 62% for a thickness of 14 $\mu$.

EXAMPLE 10

A polyvinyl alcohol with an ester number equal to 0 and a viscosity of 88 cPo (4% aqueous solution) is used.

The film is treated for 30 hours at 160° and then immersed for 30 minutes in water at 95°C.

The following results are noted (for a thickness of 17–18 $\mu$):

Flow rate: 72 l/day.m$^2$
Degree of rejection: 35%
Flow rate for a film of 1 $\mu$: 1,290 l/day.m$^2$.

EXAMPLE 11:

25 g of polyvinyl alcohol (ester number: 0; viscosity in centipoises at 20°C as a 4% strength aqueous solution: 30) are dissolved in 75 g of dimethylsulphoxide DMSO) at 120°C.

This solution is injected at the rate of 4.5 cm$^3$/minute into the annular orifice (in the shape of a ring) of a spinneret (internal diameter of the ring 0.6 mm; external diameter of the ring: 0.8 mm). The part supporting the spinneret and the spinneret are kept at a temperature of 90°C.

The spinneret is positioned along a vertical axis, and its lower end (orifice) is 5 cm above a bath of methanol kept at 0°C, the purpose of which is to cool the fibre rapidly whilst imparting to it mechanical properties which are adequate to enable it to be handled; moreover, this methanol bath serves partially to remove the DMSO.

At the centre of the annular orifice of the spinneret, there is a second orifice of diameter 0.3 mm through which a stream of nitrogen is injected, at the rate of 240 cm$^3$/hour, into the core of the hollow fibre being formed.

The hollow fibre being formed passes vertically through the methanol bath over a length of 1 m, at a rate of 10.5 m/minute. At the outlet of this bath, the hollow fibre is wound up on two cylinders half immersed in methanol, which makes it possible to continue the washing of the fibre. The latter is then dried successively at 80°C for 1.5 minutes and then at 120°C for 1.5 minutes. The fibre is then stretched by 400%, the latter being in contact (for about 1 second) with a plate heated to 150°C.

The filament is then subjected to a crosslinking heat treatment by passing it over cylinders situated in a ventilated oven. The filament is thus kept at constant length for 55 minutes at an average temperature of 210°C. An aqueous heat treatment is then carried out on the filament, wound up into a skein, for 2 hours at 95°C and the skein thus treated is then left for 24 hours in the atmosphere at ambient temperature.

Using these fibres, the external diameter of which is 225 $\mu$ and the thickness of the walls of which is 39 $\mu$, a bundle consisting of 250 parallel strands, each of which has a useful length of 38 cm, and which are open at one end only, is produced. This bundle, which has a surface area of exchange of 435 cm$^2$ (surface area inside the fibres), is introduced into a measurement cell which makes it possible to determine the osmotic characteristics of the fibres.

An aqueous solution of NaCl of concentration 5 g/l is circulated outside the fibres under a relative pressure of 25 bars and at a temperature of 23°C. The flow rate of osmosate measured is 5.2 l/day.m$^2$ and the degree of rejection of salt is 26%.

We claim:

1. In a process for the heat treatment of material of thickness from 10 to 50 $\mu$, said material having been formed from a polyvinyl alcohol/solvent mixture, said solvent being capable of dissolving said polyvinyl alcohol, said polyvinyl alcohol having an ester number from 0 to 5, and a viscosity, as a 4% by weight aqueous solution, from 5 to 100 cPo at 20°C., the improvement wherein the material is subjected to, successively, i. a dry heat treatment at a temperature of from 160°C to 220°C and for a period of about 10 minutes to about 70 hours, carried out under conditions such that the point M (defined, in a system of three rectangular cartesian co-ordinates, $\phi$, $h$ and $v$, denoting respectively the temperature in degrees Centigrade, the duration in hours of the heat treatment represented on a logarithmic scale and the visocosity in cPo at 20°C. of a 4% by weight aqueous solution of the polyvinyl alcohol) is contained within a solid A B C D A' B' C' D', the said solid having four plane faces A B B' A', A' B' C' D', D' C' C D and A B C D and two faces in the form of hyperbolic paraboloids, A A' D D' and B B' C C', said solid being defined by the frontal and horizontal projections of its apices in FIG. 1 of the accompanying drawings, and ii. a treatment in water at a temperature of 90°C or above 90°C. for more than 5 minutes.

2. In a process for the heat treatment of material of thickness from 10 to 50 $\mu$, said material having been formed from a polyvinyl alcohol/solvent mixture, said solvent being capable of dissolving said polyvinyl alcohol, said polyvinyl alcohol having an ester number from 0 to 5, and a viscosity, as a 4% by weight aqueous solution, from 20 to 90 cPo at 20°C., the improvement wherein the material is subjected to successively:

i. a dry heat treatment at a temperature of from 160°C to 220°C. and for a period of about 12 minutes to about 65 hours, carried out under conditions such that the point $M_1$ (defined, in a system of three rectangular cartesian co-ordinates, $\phi$, $h$ and $v$, denoting respectively, the temperature in degrees Centigrade, the duration in hours of the heat treatment represented on a logarithmic scale and the viscosity in cPo at 20°C., of a 4% by weight aqueous solution of the polyvinyl alcohol) is contained within a solid $A_1$ $B_1$ $C_1$ $D_1$ $A'_1$ $B'_1$ $D'_1$, the said solid having four plane faces $A_1$ $B_1$ $B'_1$ $A'_1$, $A'_1$ $B'_1$ $C'_1$ $D'_1$, $D'_1$ $C'_1$ $C_1$ $D_1$ and $A_1$ $B_1$ $C_1$ $C_1$ $D_1$, and two faces in the form of hyperbolic paraboloids, $A_1$ $A'_1$ $D_1$ $D'_1$ and $B_1$ $B'_1$ $C_1$ $C'_1$, said solid being defined by the frontal and horizontal projections of its apices in FIG. 2 of the accompanying drawings, and ii. a treatment in water at a temperature of 90°C or above 90°C. for more than 5 minutes.

3. Process according to claim 1 wherein the duration of the treatment in the water is from 10 minutes to 5 hours.

4. Process according to claim 1 wherein the material is in the form of a hollow fibre whose wall has a thickness of from 10 to 50 $\mu$.

5. Process according to claim 4 wherein the external diameter of the hollow fibre is from 30 $\mu$ to 1 mm.

6. In a reverse osmosis apparatus the improvement wherein the membrane comprises polyvinyl alcohol material obtained by a process as defined in claim 1.

7. A process for the fractionation of a saline solution by reverse osmosis which is carried out in apparatus as defined in claim 6.

8. A process according to claim 7 wherein the solution contains a sulphate.

* * * * *